Patented Dec. 21, 1948

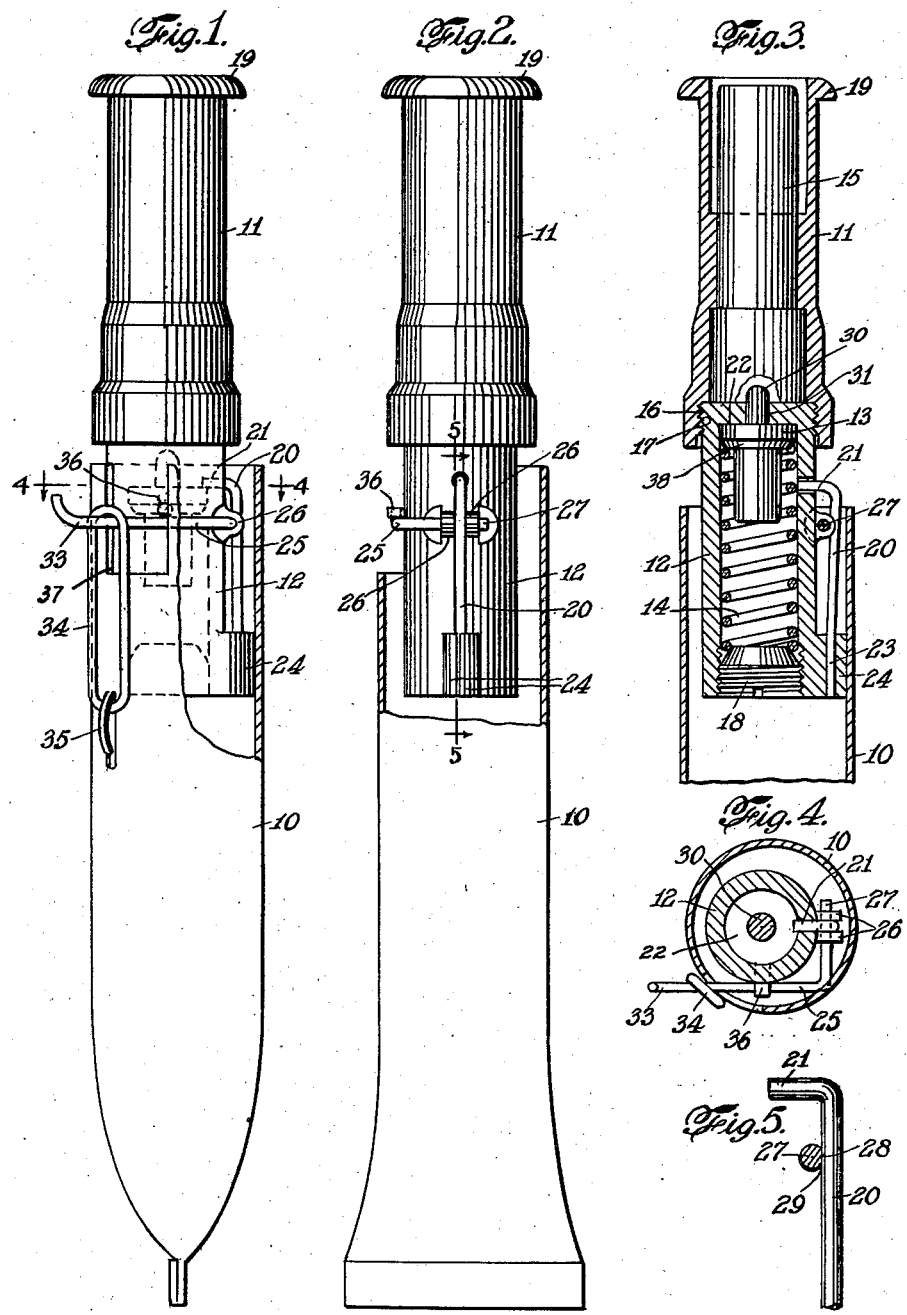

2,456,957

UNITED STATES PATENT OFFICE 2,456,957

GUN TRAP

Harold B. Koch and John U. Lehn, Lititz, Pa., assignors to Animal Trap Company of America, Lititz, Pa., a corporation of Pennsylvania Application September 28, 1945, Serial No. 619,122

7 Claims. (Cl. 43—84)

The present invention relates to traps for destroying predatory animals, for example, coyotes and wolves, by explosively discharging poison or other material into the mouth of an animal springing the trap. The poison and a propellant charge of explosive are preferably contained in a cartridge somewhat similar to a gun cartridge. The cartridge is fired by a trap provided with means for holding the cartridge and suitable bait or lure, a firing pin for discharging the cartridge, and trigger mechanism for releasing the firing pin to discharge the cartridge when the bait is seized by an animal for which the trap is set.

As the traps are operated out of doors, where they are subject to the deleterious effects of dirt, rain, snow, ice, etc., it is important for them to be capable of operating satisfactorily under extremely adverse conditions. Moreover, the traps must be sufficiently sensitive to be discharged quickly and surely when the bait is seized by an animal for which the trap is set, and must yet be entirely safe so that the trap will not be discharged accidentally while being set or by being stepped on or struck by cattle, sheep, horses or other animals. In order for the traps to be satisfactory from a practical and commercial point of view, they must be sufficiently simple and fool-proof that they can be used and serviced by persons not having any great amount of mechanical skill, and must be sufficiently inexpensive that a trapper can afford to own and operate a long line of traps.

Various expedients have been resorted to to accomplish these ends, but there has remained a need for a device adapted to operate positively when a predator pulls upwardly on a bait, but to be substantially free from danger of operation under other conditions, which can be used and re-used with extreme ease and certainty, and which is composed of simple, rugged and durable operating parts, and can be cheaply manufactured.

With the foregoing and other considerations in view, the present invention provides an arrangement which can be safely and effectively used under a wide variety of conditions and which is exceedingly accurate and selective in operation and arrangement. The parts are so arranged as to be substantially free from such wear as might effect the accuracy and selectivity of the device during continued use, and are so formed as to provide ease of setting the trap, and a maximum of certainty and effectiveness in operation.

In the drawings,

Fig. 1 is a side view of a gun trap exemplifying the invention, a portion of the device being shown broken away to expose the parts underneath.

Fig. 2 is a view at right angles to Fig. 1, a portion of the device being shown broken away to expose the parts underneath.

Fig. 3 is a longitudinal sectional view of the upper portion thereof after the cartridge has been fired.

Fig. 4 is a section on the line 4—4 of Fig. 1, and

Fig. 5 is an enlarged fragmentary view of part of the trigger release mechanism.

The particular embodiment of the invention, shown by way of example in the drawings, comprises a hollow stake and socket member 10, a cartridge holder 11, and a cylinder 12 containing a firing pin 13 adapted to be pressed upwardly toward the top of the cylinder by a coil spring 14. When the trap is set, and when released is pressed by the spring to a position wherein it will discharge a cartridge 15 within the holder 11. The cylinder 12 is separably connected with the holder 11 by means of interengaging threaded portions 16 and 17 and the lower end of the cylinder has threaded therein a plug 18 providing a lower pressure surface for the spring 14. There is provided suitable means, such as flange 19 on the holder 11, for retaining the bait, lure or other material used to attract the predator to the trap.

The firing pin is retained in the position of Fig. 1 by means of a resilient catch 20, the upper end 21 of which normally extends in the path of movement of a surface 22 on the firing pin. The lower end 23 of the catch member 20 is held between lugs 24 extending outwardly from the cylinder 12 and pressed together to grip the catch member. In the embodiment shown in the drawings the catch member comprises merely an L-shaped piece of resilient wire. The catch is releasable by being flexed to cause outward movement of its upper end 21. In order to bring about such outward movement there is provided a trigger-release member 25 in the form of a bent wire, one end of which forms a shaft portion 27 which is pivoted on brackets 26 and extends just inside the stem of the member 20, while the other end provides an arm 33. As will be seen particularly well from Fig. 5, the portion 28 thereof which contacts the member 20 is formed as a cam or eccentric, e. g., by being flattened on one side. Accordingly, when the portion 27 is rotated in a counter-clockwise direction, the corner 29 thereof will cam the catch 20 outwardly and withdraw the end 21 of the latter from the path of upward movement of the firing pin 13. The withdrawal of the end 21 allows the spring 14 to drive the firing pin upwardly, permitting its point 30 to protrude through an opening 31 in the top of the cylinder 12 to strike a cartridge 15 and explode it.

Counter-clockwise movement of the cam portion 28 to spring the trap is caused by relative vertical movement of the bracket 26 and the free end of arm 33 of the release member 25. Since upward movement of the holder 11 and the cylinder 12 will occur when a predator tries to detach a bait, and since the brackets 26 are attached to and move upwardly with the cylinder 12, upward movement of the holder 11 will result in the rotation of the portion 27 and the release of the firing pin unit if the end of arm 33 of the release member 25 is held stationary. In order to hold the end of arm 33 stationary, it is attached to the stake member 10, being releasably attached in the present instance by means of a chain link 34 extending downwardly therefrom and secured to the stake member, as by a pressed-out and bent-in lug 35. The end of arm 33 of the release 25 is bent upwardly as shown in order that it may securely retain the link 34.

The provision of rotary camming means assures quick releasing action at a given time without danger of release at an earlier time, and the provision of a detachable camming member facilitates both the manipulation and the operation of the trap.

There is provided a pin 36 directly above the release member 25 to prevent the rotation of the member of the portion 27 in a clockwise direction (Fig. 5) and thus avoiding danger of accidental release of the gun by downward pressure on the holder 11, as, for example, if an animal steps on it. The socket member is provided with a notch at 37 to receive the release member 25. The lower edge of the notch 37 serves as a shoulder upon which the release 25 is adapted to rest when it is in a horizontal position against the pin 36, thus limiting the downward movement of the holder 11 and cylinder 12 in the socket member 10. The link 34 extends up sufficiently above the bottom of the notch 37 to permit the link to be swung over the upturned end of the arm 33 when the trap is being set. The link 34 is hence slack when the arm 33 rests on the bottom of the notch 37. In Figs. 1 and 2 the cylinder is shown raised sufficiently to take the slack out of the link 34. Further upward movement of the cylinder 11 results in the link pulling downward on the arm 33 to rotate the cam portion 28 and release the firing pin.

In order to permit a trap to be set simply by pressure on the point 30 of the firing pin with the usual tool, one or both of the contacting surfaces of the end 21 and the firing pin unit are beveled. In the present instance the firing pin has a lower beveled surface, as indicated at 38.

As shown in the drawings, the cylinder 12 is made considerably smaller than the interior diameter of the socket member 10 so as to permit considerable lateral and angular movement of the holder 11, as when it is knocked by grazing cattle or by exploratory touches of a predator, without in any way affecting the stability of the firing pin which will be released only upon upward movement of the holder 11. The gun will thus be free from danger of operation by tilting, but will be operated with effectiveness and certainty when a predator pulls the bait upwardly to dislodge it. If a predator seizes the bait and pulls upwardly at an angle to the vertical the holder 11 is automatically tilted to aim the gun trap at the animal's mouth.

As will be seen, the release of the firing pin unit is positive after the portion 27 has been rotated to a measured extent, but until this time the firing pin is held securely in place. Moreover, it is effected without significant wear on the cam member, which is subjected to friction only during its own small movement. Thus the time of release remains substantially constant throughout very many release and resetting operations.

The trap can be set time and again with the utmost ease by merely pressing down on the point 30 of the firing pin with a tool of the usual type inserted in the holder 11 prior to the placement of a cartridge. There is no substantial possibility of any of the parts blocking any of the other parts in this operation.

In use, the stake or socket 10, with the cylinder 12, is driven into the ground. The firing pin is set by being pushed inwardly with a suitable tool engaging the point of the firing pin and passing through the opening 31. A cartridge is placed in the cartridge chamber and the chamber is screwed onto the cylinder 12. The cylinder is then inserted in the socket 10 with the release member 25 resting in the notch 37 and the link 34 is swung up over the arm 33 of the release member. Suitable bait or lure may be secured to the cartridge chamber either before or after it is attached to the cylinder. The sequence of steps required to put the trap in the set position shown in Fig. 1 may be varied, as desired.

What we claim and desire to secure by Letters Patent is.

1. In a gun trap, the combination with a socket member, a hollow cylinder longitudinally movable in said socket member, a cartridge holder movable with said hollow cylinder, and a spring-pressed firing pin movable within said hollow cylinder to contact and to fire a cartridge in said holder of a resilient catch adapted to engage said firing pin and normally urged by its resilience into engagement with said firing pin to hold the firing pin in cocked position, means movable independently of the aforesaid elements for positively camming said catch out against its resiliency to release said firing pin when said holder is moved vertically in one direction, and means for restricting the movement of said holder in the opposite direction to prevent release of the catch by such movement.

2. In a gun trap, the combination with a socket member, a hollow cylinder longitudinally movable in said socket member, a cartridge holder movable with said hollow cylinder, and a spring-pressed firing pin movable within said hollow cylinder to contact and to fire a cartridge in said holder, of a resilient member extending upwardly from a lower portion of said cylinder and having at its upper end a detent portion adapted to engage said firing pin and normally urged into engagement with said firing pin by the resilience of said member to hold the firing pin in cocked position, rotatable means adjacent said resilient member and having a cam portion disposed between said member and the wall of said cylinder adapted to flex said arm positively to withdraw said end and release the firing pin, and means to rotate said rotatable means.

3. In a gun trap, the combination with a socket member, a hollow cylinder longitudinally movable in said socket member, a cartridge holder with said hollow cylinder, and a spring-pressed firing pin movable within said hollow cylinder to contact and to fire a cartridge in said holder, of a resilient member extending upwardly from a lower portion of said cylinder and having at its upper end a detent portion adapted to engage said firing pin and normally urged into engagement with said firing pin by the resiliency of said member to hold the firing pin in cocked position, rotatable means adjacent said resilient member and having a cam portion between said member and the wall of said cylinder adapted positively to flex said arm outwardly to withdraw said end and release the firing pin, an operating arm extending from said rotatable means, and means to releasably connect said arm with said socket member.

4. In a gun trap, the combination with a socket member, a hollow cylinder longitudinally movable in said socket member, a cartridge holder movable with said hollow cylinder and a spring-pressed firing pin movable within said hollow cylinder to contact and to fire a cartridge in said holder, of a resilient member extending upwardly from a lower portion of said cylinder and having an upper end adapted normally to engage said firing pin, a bent wire having a deformed portion in proximity to said resilient member and mounted on said cylinder for rotation of the deformed portion to exert a camming action on the resilient member to release the catch, and having a transversely extending portion, and connecting means, between said socket member and said transversely extending portion.

5. In a gun trap, the combination with a socket member, a hollow cylinder longitudinally movable in said socket member, a cartridge holder movable with said hollow cylinder and a spring-pressed firing pin movable within said hollow cylinder to contact and to fire a cartridge in said holder, of a resilient member extending upwardly from a lower portion of said cylinder and having an upper end adapted normally to engage said firing pin, a bent wire having a deformed portion in proximity to said resilient member and mounted on said cylinder for rotation of the deformed portion to exert a camming action on the resilient member to release the catch, and having a transversely extending portion having an upturned end, and connecting means flexibly secured to said socket member and extending over said upturned end.

6. In a gun trap, the combination with an anchor, a hollow cylindrical member, movable relative to said anchor, a cartridge holder associated with said member and a spring-pressed firing pin movable within said hollow member and adapted to strike and fire a cartridge held by said holder, of means for releasably holding said firing pin in cocked position comprising a resilient member mounted on the exterior of said hollow member and a detent portion extending through the wall of said hollow member and normally pressed inwardly by the resiliency of said resilient member to hold the firing pin in cocked position and a release member connected with said anchor and having a cam portion disposed between said resilient member and the wall of said hollow member and adapted positively to move said detent portion outwardly against the pressure of said resilient member, to release the firing pin upon movement of said hollow member relative to said anchor.

7. In a gun trap provided with anchoring means, a hollow cylindrical member movable relative to said anchoring means, a cartridge holder associated with said member, and a spring pressed firing pin movable in said hollow member and adapted to strike and fire a cartridge held by said holder, the combination of a spring member mounted on the exterior of said hollow member and having a free end portion turned inwardly at approximately right angles and projecting through the wall of said hollow member, said in-turned end portion being normally pressed inwardly by the resiliency of said spring to engage the firing pin and hold it in cocked position, and a wire shaped to provide a shaft portion rotatably mounted on said cylinder and having a deformed portion disposed between said spring and the wall of said hollow member and adapted to exert a camming action on the spring positively to push the spring out to withdraw said in-turned end and release the firing pin, and an arm portion projecting laterally from said shaft portion, said arm being operatively connected with said anchoring means to rotate said shaft portion upon relative movement of said hollow member and anchoring means.

HAROLD B. KOCH.
JOHN U. LEHN.

REFERENCES CITED

The following references are of record in the file of this patent:

UNITED STATES PATENTS

| Number | Name | Date |
|---|---|---|
| 1,233,268 | Gleason | July 10, 1917 |
| 1,254,130 | Fencl et al. | Aug. 14, 1923 |
| 2,145,488 | Marlman | Jan. 31, 1939 |